Patented May 11, 1954

2,678,312

UNITED STATES PATENT OFFICE 2,678,312

PREPARATION OF THIAMIN CHLORIDE HYDROCHLORIDE

Robert E. Carnahan, New London, Conn., assignor to Chas. Pfizer & Co., Inc., Brooklyn, N. Y., a corporation of Delaware No Drawing. Application July 31, 1951,
Serial No. 239,629

7 Claims. (Cl. 260—256.6)

This invention concerns a novel method for converting thiamin bromide hydrobromide to the corresponding chloride hydrochloride. A particular object hereof is the economical recovery of thiamin chloride hydrochloride of high purity.

In the commercial preparation of thiamin hydrochloride (the popular term for thiamin chloride hydrochloride), the hydrobromide (bromide hydrobromide) is first obtained as an intermediate. Since the hydrochloride is the preferred form of the vitamin for most therapeutic uses, incorporation in pharmaceuticals and so forth, the hydrobromide must be converted to this form. The principal commercial method utilized for this purpose is treatment of the hydrobromide intermediate with silver chloride in hot water. Although this procedure is useful, it is expensive. Loss of the silver salt during processing adds to the cost of the vitamin and, in times of scarcity of the metal, production is hampered. Another method that has been used is conversion of the hydrobromide to the picrate and conversion of the picrate to the hydrochloride. This, of course, adds a further step to the process with accompanying losses and expense of operation.

It has now been found that thiamin bromide hydrobromide may be converted to thiamin chloride hydrochloride in good yield by chlorinating the former in the presence of a compound which will preferentially absorb bromine or react with it rather than chlorine. More specifically, the invention comprises chlorinating an aqueous solution of the thiamin hydrobromide intermediate containing a bromine absorber, such chlorination being best effected by contacting the solution with gaseous chlorine. Bromine is, of course, released during the reaction. The absorbent takes this up, becoming brominated, and the brominated material may be readily separated from the thiamin hydrochloride reaction product.

A number of different compounds have been discovered to be useful as these novel "bromine absorbers." Especially satisfactory and preferred are phenolic compounds like phenol, $\alpha$- or $\beta$-keto acids or esters such as aceto-acetic acid, heterocyclic nitrogen compounds such as pyridine, olefinic hydrocarbons, aromatic amines like aniline and aromatic hydrocarbons which are readily brominated such as phenanthrene. Other organic substances, for instance ketones, may be used but, since certain brominated ketones are lachrymators, the aforementioned class is best. A proportion of the bromine absorber should generally be used which is at least sufficient to react with practically all of the bromine produced during the reaction. It has been found that for best chlorination in an aqueous system a bromine absorber which possesses at least slight solubility in water is especially effective. Phenol has thus proved particularly useful.

According to one specific embodiment of this new process, thiamin hydrobromide is dissolved in water to provide at least about a 1% solution, or preferably a somewhat higher concentration. An organic-type bromine absorber is added. The mixture may be cooled below room temperature (to between about 5 and 15° C.) for best operation, although temperatures as high as about 50° C. may be used. Chlorine is then bubbled into the mixture until at least the stoichiometric amount required for conversion of the vitamin to its hydrochloride has been absorbed. The mixture is stirred and may be cooled throughout the chlorination, and various known devices to assure good absorption of the gas may be used. When the reaction has been completed (in a relatively short time, at the most a few hours), the brominated absorbent is extracted by means of a suitable solvent. Halogenated hydrocarbons are generally cheap and satisfactory for this purpose, but obviously many other organic water-immiscible solvents may be chosen. Chloroform and carbon tetrachloride are particularly useful. Although not preferred, it is possible to run the reaction in a two-phase system: that is, using simultaneously a water phase and a water-immiscible organic solvent phase. Vigorous agitation is employed while the chlorine is being introduced. Sometimes, too, the brominated organic compound has but slight solubility in the reaction mixture and, when no solvent is used, the bromo compound may be simply filtered at the end of the reaction. Small amounts which are not thus removed may then be extracted.

After completion of the chlorination and the extraction of the brominated organic absorber, the aqueous phase may be clarified, if necessary, and concentrated under vacuum at a moderately elevated temperature, generally below the boiling point of water or not higher than about 90° C. The concentrate may then be treated with a water-miscible organic solvent in which the thiamin hydrochloride product has low solubility, e. g. acetone, dioxane or preferably ethanol. The mixture is stored for a few hours at a low temperature and crystalline thiamin hydrochloride of high quality is obtained in good yield. This can be filtered, washed with more of the cold, water-miscible solvent used for the crystallization and dried, preferably under vacuum at a moderately elevated temperature. Using this procedure, yields of as great as 97% of high quality thiamin hydrochloride have been recovered.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

*Example I*

Thiamin bromide hydrobromide (160 grams, 0.37 M) melting at 220–222° C. and 35.3 grams of phenol U. S. P. (0.375 M—a 50% excess) were dissolved in 1875 ml. of water. The solution was cooled to 10° C. and, while stirring the mixture, chlorine was bubbled in. After 43 minutes, 54 grams of chlorine (0.76 M—slightly more than the theoretical amount required) had been absorbed. Five hundred ml. of chloroform were added and the mixture was stirred thoroughly. The organic and aqueous phases were allowed to separate and the chloroform layer containing the brominated phenol was removed. It was observed that as this brominated phenol separated during the reaction, it seemed to remove deeply colored impurities with it. The aqueous phase was extracted with three more 500 ml. portions of chloroform and concentrated under vacuum at 55° to 85° C. When a volume of 180 ml. was reached, concentration was stopped and 3 liters of absolute ethanol were added. The slurry of crystals that formed was allowed to stand in a refrigerator overnight. The product was then filtered, washed with cold absolute ethanol and dried at 70–75° C. under vacuum for 4 to 4½ hours. A yield of 87.1% of the theoretical amount of thiamin chloride hydrochloride, melting at 242–243° C. (corr.) was obtained.

*Anal.* — Calcd. for $C_{12}H_{17}ON_4SCl \cdot HCl$: Cl, 21.02%. Found: Cl, 20.96, 20.96.

*Example II*

Thiamin bromide hydrobromide (8.5 grams, 0.02 M) melting at 217–220° C. and 5.2 grams (0.04 M) of acetoacetic ester were added to 85 ml. of water. The mixture was cooled to 8–10° C. and chlorine gas was bubbled through it until the reaction vessel had increased in weight by 1.4 grams (0.02 M of chlorine). This addition took approximately 30 minutes. The mixture was stirred rapidly throughout the chlorination. After the reaction had been completed, the brominated keto ester by-product was extracted twice with 50 ml. portions of chloroform. The remaining aqueous phase was evaporated under vacuum to approximately 11 ml. volume, 200 ml. of absolute ethanol were added and the mixture was stored at a low temperature for several hours. The crystalline thiamine chloride hydrochloride product was filtered and dried. It weighed 5.0 grams (74.6% of theory) and melted at 245–247° C.

*Example III*

Thiamin hydrobromide (8.5 grams, 0.02 M) and 1.6 ml. of pyridine (0.02 M) were added to 85 ml. of water. The mixture was stirred and cooled and chlorine gas was bubbled into it. The addition of chlorine was stopped when the mixture had increased in weight by 1.5 grams (0.021 M). A dark colored precipitate, apparently pyridine perbromide, was filtered out and the filtrate was then extracted with four 50 ml. portions of chloroform. The aqueous phase was concentrated under vacuum to 10 ml. volume, 200 ml. of absolute ethanol were added and the resulting suspension of crystals was stored overnight in a conventional refrigerator. The thiamin chloride hydrochloride product was filtered and dried as previously described. It weighed 3.6 grams (53.7% of theoretical yield) and melted at 242.8–243.8° C. On concentrating the mother liquor, the yield of product was raised to 58.2%.

What is claimed is:

1. A process for preparing thiamin chloride hydrochloride which comprises contacting an aqueous solution of thiamin bromide hydrobromide with chlorine gas, at a temperature up to about 50° C. and in the presence of an organic bromine-absorber.

2. A process for preparing thiamin chloride hydrochloride which comprises contacting with chlorine gas, at a temperature up to about 50° C., an aqueous solution of thiamin bromide hydrobromide containing an organic bromine-absorber, removing the brominated absorbent, and recovering the thiamin chloride hydrochloride product.

3. A process for preparing thiamin chloride hydrochloride which comprises contacting with chlorine gas, at a temperature between about 5° and 50° C., an aqueous solution of thiamin bromide hydrobromide containing an organic, water-soluble bromine-absorber, extracting the brominated absorbent with organic, water-immiscible solvent, and recovering crystalline thiamin chloride hydrochloride.

4. A process as claimed in claim 1 wherein the bromine absorber is chosen from the group consisting of phenols, keto acids and esters, aromatic amines, heterocyclic nitrogen compounds, aromatic hydrocarbons and olefinic hydrocarbons.

5. A process as claimed in claim 3 wherein the bromine absorber is phenol.

6. A process as claimed in claim 3 wherein the bromine absorber is acetoacetic acid ester.

7. A process as claimed in claim 3 wherein the bromine absorber is pyridine.

References Cited in the file of this patent

Williams, Ind. Eng. Chem., 29, 980–983 (1937).